(12) United States Patent
Wei et al.

(10) Patent No.: US 10,982,760 B2
(45) Date of Patent: Apr. 20, 2021

(54) ACTUATOR ARRANGEMENT FOR A MOTOR VEHICLE TRANSMISSION

(71) Applicant: Schaeffler Technologies AG & Co. KG, Herzogenaurach (DE)

(72) Inventors: Yunfan Wei, Bühl (DE); Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/486,202

(22) PCT Filed: Apr. 5, 2018

(86) PCT No.: PCT/DE2018/100303
§ 371 (c)(1),
(2) Date: Aug. 15, 2019

(87) PCT Pub. No.: WO2018/202234
PCT Pub. Date: Nov. 8, 2018

(65) Prior Publication Data
US 2020/0056699 A1  Feb. 20, 2020

(30) Foreign Application Priority Data
May 2, 2017  (DE) .......................... 102017109361.3

(51) Int. Cl.
*F16H 61/00*  (2006.01)
*F16H 61/30*  (2006.01)
*F16H 61/02*  (2006.01)

(52) U.S. Cl.
CPC .......... *F16H 61/30* (2013.01); *F16H 61/0025* (2013.01); *F16H 61/0206* (2013.01); *F16H 61/0267* (2013.01); *F16H 61/0276* (2013.01)

(58) Field of Classification Search
CPC .. F16H 61/30; F16H 61/0025; F16H 61/0206; F16H 61/0267; F16H 61/0276
See application file for complete search history.

(56) References Cited

U.S. PATENT DOCUMENTS

2011/0023647 A1* 2/2011 Engel ...................... F16H 61/30
  74/473.11
2012/0199217 A1* 8/2012 Long .................... F16H 61/0025
  137/468

(Continued)

FOREIGN PATENT DOCUMENTS

DE  10240259 A1  6/2003
DE  102012003415 A1  8/2013

(Continued)

*Primary Examiner* — David J Hlavka
(74) *Attorney, Agent, or Firm* — Kevin Parks

(57) ABSTRACT

An actuator arrangement for a motor vehicle transmission includes a pump device, a shifting interface, and a switching logic device. The pump device has a pump for fluidic actuation of a clutch, and an electric motor for driving the pump. The shifting interface is connected to the pump device for actuating the motor vehicle transmission. The shifting interface has at least one of a shift lever, a shifting pawl mechanism, or a shifting shaft. The switching logic device is arranged between the shifting interface and the pump device. The pump device is arranged to actuate the shifting interface sequentially with respect to the clutch.

13 Claims, 3 Drawing Sheets

(56) References Cited

U.S. PATENT DOCUMENTS

2016/0032986 A1* 2/2016 Pritchard ............ F16H 61/0206
192/85.61
2016/0327157 A1* 11/2016 Herkommer ............ F16H 61/28
2017/0037960 A1 2/2017 Grethel

FOREIGN PATENT DOCUMENTS

DE 102015213540 A1 2/2016
DE 102015208653 A1 11/2016

* cited by examiner

ACTUATOR ARRANGEMENT FOR A MOTOR VEHICLE TRANSMISSION

CROSS-REFERENCE TO RELATED APPLICATIONS

This application is the United States National Phase of PCT Appln. No. PCT/DE2018/100303 filed Apr. 5, 2018, which claims priority to German Application No. DE102017109361.3 filed May 2, 2017, the entire disclosures of which are incorporated by reference herein.

TECHNICAL FIELD

The disclosure relates to an actuator arrangement for a motor vehicle transmission, in particular a powered two- or three-wheeler transmission, which comprises a fluidically actuable clutch for transmitting a drive torque and a transmission having at least two gear stages, which can be engaged and/or disengaged via a shifting interface.

BACKGROUND

DE 10 2012 003 415 A1 discloses an actuator arrangement for a motor vehicle drive train, which has at least one friction clutch for transmitting drive torque, in particular in the form of a starting clutch, and a double clutch transmission having at least two gears stages, which can be engaged and disengaged by means of a shifting clutch arrangement. The actuator arrangement comprises a hydraulic circuit, which has a pump that can be driven by means of an electric motor and which has a hydraulic clutch cylinder, by means of which the friction clutch can be actuated, and a shifting-actuator arrangement for actuating the shifting clutch arrangement.

In this case, the shifting actuator arrangement has a shifting drum as a shifting interface, which is coupled or can be coupled to the electric motor via a shifting drum coupling device in such a way that the shifting drum can be set in rotation by means of the electric motor in order to actuate the shifting clutch arrangement. For this purpose, it is envisaged that the shifting drum coupling device is arranged between the pump and the electric motor which drives the pump.

SUMMARY

According to the disclosure, an actuator arrangement for a motor vehicle transmission, e.g., a powered two- or three-wheeler transmission, which has a fluidically actuable clutch for transmitting a drive torque and a transmission having at least two gear stages and can be engaged and/or disengaged via a shifting interface, is provided. The actuator arrangement includes: (i) a pump device assigned to the clutch for the fluidic actuation of the clutch including a pump and an electric motor for driving the pump, (ii) the shifting interface for transmission actuation, which is connected to the pump device, and (iii) a switching logic device, which is arranged between the shifting interface and the pump device. The shifting interface can be actuated sequentially with respect to the clutch by means of the pump device.

In this arrangement, it is envisaged that the shifting interface includes at least one of the following shifting components:
(i) a shift lever,
(ii) a shifting pawl arrangement having a shifting pawl or
(iii) a shifting shaft.

As an alternative, however, the shifting component of the shifting interface could also be:
(iv) a shifting drum arrangement having at least one shifting drum.

Shifting components (i)-(iv) of this kind are typical shifting components for a powered two- or three-wheeler transmission.

A motor vehicle transmission is taken to mean a transmission having a clutch and a plurality of gear stages. In an example embodiment, the motor vehicle transmission is an automated shift transmission (ASG). A powered two- or three-wheeler transmission is taken to mean a corresponding transmission for a powered two- or three-wheeler. The term powered two- or three-wheeler includes the following motor vehicle types: motorcycles, motor scooters, small-displacement motorcycles (mopeds, motor bicycles, kick start mopeds etc.), light powered two- or three-wheelers, light motorcycles, three wheeled motorcycles (combinations, trikes etc.).

A clutch is may be a friction clutch, which is closed in the normal state and thus exhibits frictional engagement with a friction partner for the transmission of a torque, in particular a drive torque, in the normal state. The clutch can be transferred fluidically from the closed state to an open state and the frictional engagement with the friction partner is canceled in the open state.

A switching logic device should be taken to mean a device which can assume at least two different states. On the one hand, the switching logic device can assume a closing position and/or separating position and/or decoupling position and, on the other hand, can assume at least one open position and/or connecting position and/or coupling position.

The actuator arrangement is provided for a motor vehicle transmission having only one clutch and a plurality of gear stages. The actuator arrangement has a pump device. The pump device includes a pump and an electric motor for driving the pump. It is customary for the pump to be fluidically connected to a reservoir containing an operating fluid and the operating fluid may be a hydraulic oil. In this way, it is possible to produce a hydraulic pressure by means of the pump. The pump device is assigned to the clutch. This means that the pump device is connected to the clutch by a fluid conduit, thus enabling the clutch to be fluidically actuated by means of the pump device. The pump device is furthermore connected to a shifting interface, via which the gears stages of the transmission can be engaged and/or disengaged. "Connected" means that the shifting interface is connected fluidically via a fluid conduit and/or mechanically via a mechanical link to the pump and/or the electric motor thereof.

A switching logic device is arranged between the pump device, which comprises the pump and the electric motor, and the shifting interface. The switching logic device is designed to divide and/or establish the connection between the shifting interface and the pump device. In this way, it is possible, by means of the switching logic device and by means of just one driving device, namely the electric motor of the pump, to actuate the shifting drum arrangement sequentially with the clutch. It is thus possible to make available a robust actuator arrangement which can be a produced inexpensively and can have a reduced installation space.

According to an example embodiment, it is envisaged that an actuating mechanism, in particular a hydraulic actuating mechanism, is arranged between the switching logic device and the shifting interface. The actuating mechanism is generally an actuating mechanism which acts in translation and/or in rotation. The combination of translational and rotary motion is obtained by linking a linear drive to a plurality of pivotably mounted levers/arms, for example.

In this embodiment, provision may be made for the actuating mechanism to have a return device for returning said actuating mechanism to a neutral position. For this purpose, the return device generally has at least one return spring. In particular, provision is made here for the return device to have at least one spring element as a return element.

The hydraulic actuating mechanism may have a hydraulic cylinder. A hydraulic actuating mechanism of this kind with a hydraulic cylinder is generally an actuating mechanism which acts in translation.

The switching logic device may be a hydraulic switching logic device. In an example embodiment, it is envisaged that the clutch is connected fluidically to the switching logic device.

In another example embodiment, it is envisaged that the clutch can be transferred to a first shift state, and a portion of the clutch and/or a portion of a chain of action between the pump and the clutch can be used as a pressure accumulator in the first shift state. The pump and the pressure accumulator can be connected together at least to actuate the shifting interface.

In yet another embodiment, the switching logic device is arranged between the shifting interface and the pump device, on the one hand, and between the pump device and the clutch, on the other hand.

The pump may be a reversing pump.

BRIEF DESCRIPTION OF THE DRAWINGS

The disclosure is explained by way of example below by means of illustrative embodiments with reference to the attached drawings. The features explained below can represent an aspect of the disclosure, either individually or in combination. In the drawings.

DETAILED DESCRIPTION

Figure 1:
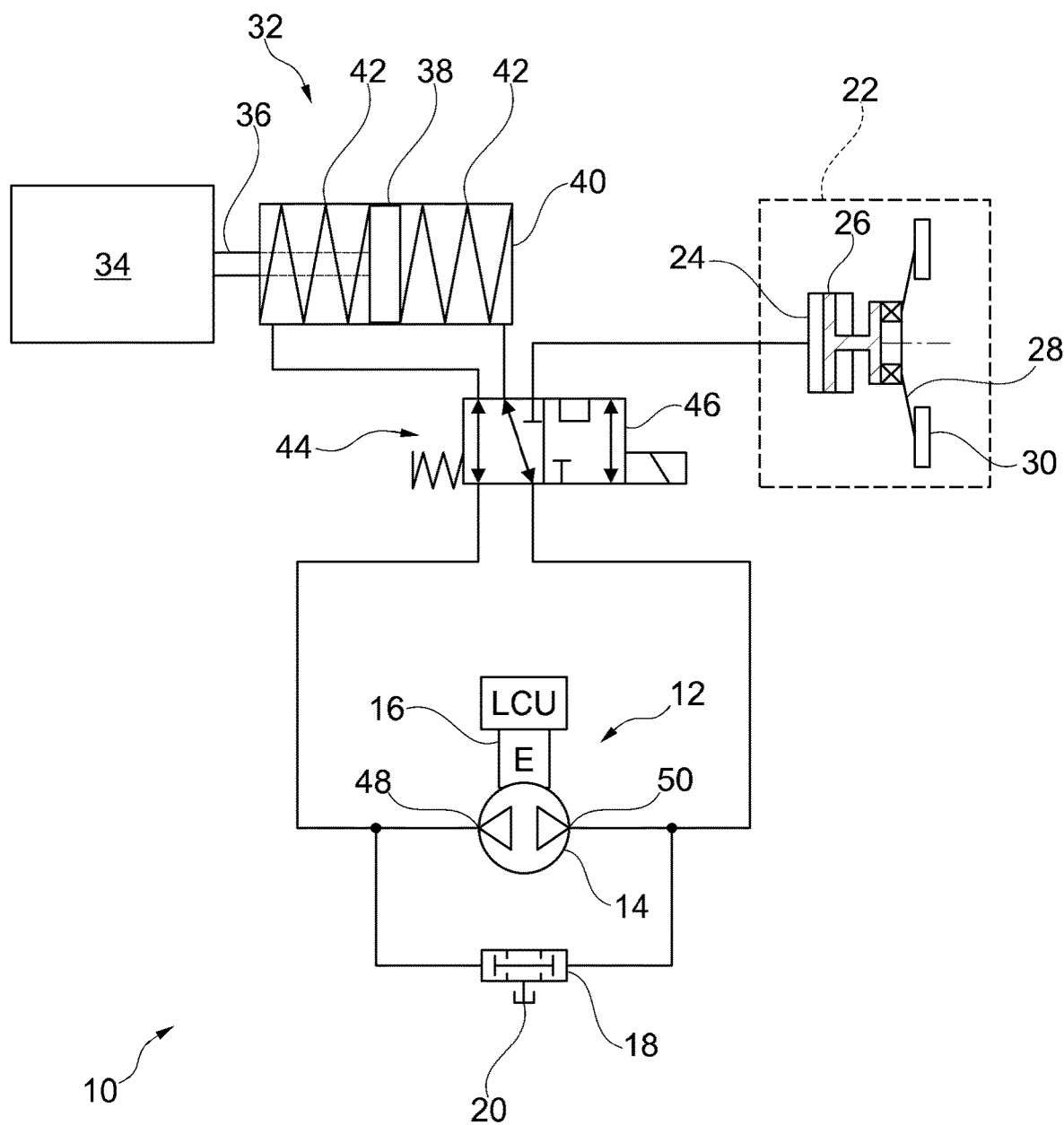
FIG. 1 shows an actuator arrangement for a motor vehicle transmission according to an example embodiment.

FIG. 1 shows a schematic diagram of an actuator arrangement 10 according to a first embodiment. The actuator arrangement 10 has a pump device 12. The pump device 12 comprises a pump 14 and an electric motor 16 for driving the pump 14. The pump 14 is a reversing pump 14, which is connected in parallel with a two pressure valve 18 via fluid conduits and is connected fluidically by means of this two pressure valve 18 to a reservoir 20 containing an operating fluid. The operating fluid may be a hydraulic oil. In this way, it is possible to produce a hydraulic pressure by means of the pump 14.

The pump device 12 is assigned to a clutch 22. This means that the pump device 12 is connected to the clutch 22 by a fluid conduit, thus enabling the clutch 22 to be fluidically actuated by means of the pump device 12. In the example shown, the clutch 22 is a friction clutch, which is closed in a normal state (NC: normally closed) and exhibits frictional engagement with a friction partner (not illustrated) for the transmission of a torque. The clutch 22 has a cylinder 24 with a movable piston 26, which is connected to a pressure plate 30 via a spring element 28, e.g., a diaphragm spring, wherein the frictional engagement with the friction partner (not illustrated) can be established and/or canceled by means of the pressure plate 30. By means of a hydraulic pressure produced by the pump 14 and applied to the clutch 22, the clutch 22 can be transferred from the closed state to an open state, wherein the frictional engagement with the friction partner is canceled in the open state. The clutch can be a wet or dry clutch.

The pump device 12 is furthermore connected to a shifting interface 34 via an actuating mechanism 32. By movement or pivoting of a shifting component of the shifting interface 34, gear stages of a motor vehicle transmission can be engaged and/or disengaged. In this illustrative embodiment, "connected" means that the actuating mechanism 32 is connected fluidically to the pump 14 by a fluid conduit and is connected mechanically to the shifting interface 34 by a linkage 36 (or in some other mechanical way). The linkage 36 is connected to a piston 38 of a hydraulic cylinder 40, which forms the active part of the actuating mechanism 32. The actuating mechanism 32 furthermore has a return device for returning the actuating mechanism 32 to a neutral position, wherein the return device has at least one spring element 42 as a return element for this purpose. In the example shown, there are two spring elements 42, which are arranged on both sides of the piston 38 and act counter to one another as tension or compression springs in such a way that the piston 38 moves into the neutral position or remains in the neutral position in the unactuated state of the actuating mechanism 32.

A hydraulic switching logic device 44 is arranged between the pump device 12, which comprises the pump 14 and the electric motor 16, and the actuating mechanism 32. The hydraulic switching logic device 44 has a valve 46. The valve 46 is designed as a 5/2-way valve and is configured to deflect the piston 38 of the hydraulic cylinder 40 of the actuating mechanism in one or the other direction relative to the neutral position along a main axis of the hydraulic cylinder 40, and to move the shifting component of the shifting interface 34 in a corresponding manner via the linkage 36, in response to an upshift or a downshift. The valve 46 can be actuated electromechanically and against a spring force.

It is furthermore shown that the clutch 22 is fluidically connected to the switching logic device 44. This means that at least one fluid conduit is routed from the clutch 22 to the switching logic device 44. In this way, a fluidic connection can be provided between the pump 12 and the clutch 22, depending on the valve position of the switching logic device 44. In the present case, the fluidic connection is illustrated as closed.

As already mentioned, the pump 14 is designed as a reversing pump and therefore has two outlets 48, 50, which are connected to the switching logic device 34 by fluid conduits. The reversing pump can be actuated in a first direction of rotation and in a second direction of rotation opposite to the first direction of rotation. In this way, the reversing pump can apply a hydraulic pressure via the first outlet 48 or the second outlet 50, depending on the direction of rotation. For this purpose, the reversing pump delivers the hydraulic oil from the reservoir 20, which is connected to the two pressure valve 18 connected in parallel with the reversing pump. The mutually separate functional actuation of the pump 14 and of the switching logic device 44 results in a highly dynamic response of the actuator arrangement 10.

For sequential actuation of the clutch 22 and the shifting interface 34 during a gear change, the valve 46 is first of all moved into the right-hand position, with the result that the fluidic connection between the pump device 12 and the shifting interface 34 is divided. The pump 14 is driven in a first direction of rotation by means of the electric motor 16 and delivers the hydraulic oil from the reservoir 20 to the clutch 22 via the fluid conduit. The hydraulic oil is fed to the cylinder 24 and brings about an axial movement of the piston 26 in the direction of the pressure plate 30, thereby compressing or tensioning the diaphragm spring 28 and releasing the frictional engagement between the pressure plate 30 and the friction partner to open the clutch. In this way, the cylinder 24 forms a pressure accumulator 24, 28 by means of the tensioned spring element 28.

As soon as the clutch 22 has been transferred to the first shift state, the switching logic device 44 switches the shifting valve 46 over, with the result that the connection to the actuating mechanism 32 or shifting interface 34 is open.

The pump 14 continues to pump hydraulic oil out of the reservoir 20 in the direction of the actuating mechanism 32/shifting interface 34. At the same time, the pressure accumulator of the clutch 22, comprising the cylinder 24 and the diaphragm spring 28, can transmit a hydraulic pressure pulse to the actuating mechanism 32 and thus the shifting interface 34. This is accomplished by the piston 26 traveling an additional release path due to the hydraulic oil, with the result that the diaphragm spring 28 pushes the piston 26 back to compensate for the additional release path. During this process, a pressure pulse arises, forcing hydraulic oil out of the cylinder 24 counter to the pumping direction of the pump 14 in the direction of the actuating mechanism 32/shifting interface 34. This pressure pulse is used to actuate the shifting interface 34 via the actuating mechanism 32. As soon as the shifting interface 34 has been actuated, the switching logic device 44 switches the valve 46 back into the initial position. The electric motor 16 is operated in a second direction of rotation counter to the first direction of rotation, with the result that the pump 14 pumps the hydraulic oil out of the cylinder 24 into the reservoir 18. As a result, the piston 26 is moved by the diaphragm spring 28 owing to the decreasing pressure in the cylinder 24, thus establishing the frictional engagement of the pressure plate 30 with the friction partner.

By means of the transfer of the clutch 22 to the first shift state, the use of the clutch 22 as a pressure accumulator 42 during the first shift state, and the combination of the pump 14 and of the pressure accumulator 24, 28 to actuate the shifting interface 34, sequential actuation of the clutch 22 and the shifting interface 34 can be provided with just one driving device. Moreover, the use of the pressure accumulator 24, 28 makes it possible to reduce the power of the pump 14 since, for the actuation of the shifting interface 34, the additional hydraulic pressure from the pressure accumulator 24, 28 can be provided for the actuation of the shifting interface 34. In this way, it is possible to reduce costs and installation space.

The corresponding transmission is, for example, a powered two- or three-wheeler transmission with a corresponding clutch. Torque tracking is therefore not necessary with a powered two- or three-wheeler clutch of this kind. Valve positions can be chosen accordingly. In most cases, the normally closed (NC) clutch can be completely closed. For this reason, the reversing pump 14 can be connected to the gear actuation cylinder instead of to the clutch 22 in the deenergized state. This configuration has the advantage that the rapid shifts can be achieved with a high dynamic response without opening the clutch 22 since no time is lost due to the switchover of the two pressure valve 18.

Figure 2:
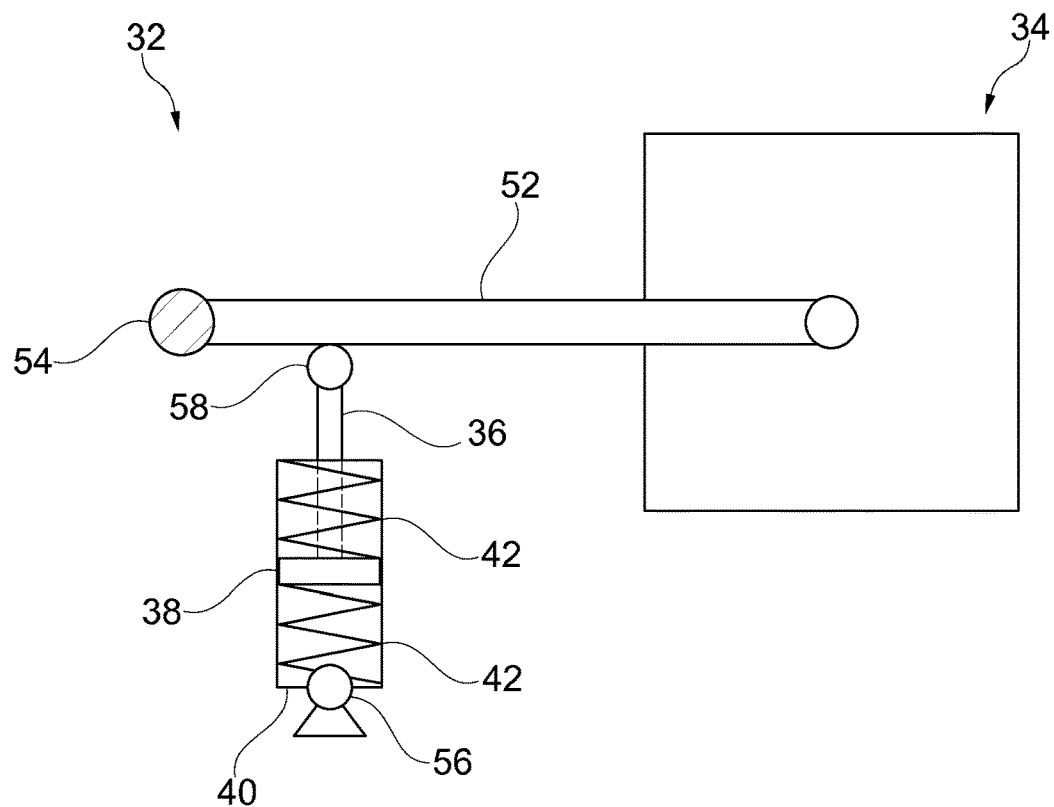
FIG. 2 shows a shifting interface and a first actuating mechanism.

FIG. 2 now shows an example of a shifting interface 34 which can be actuated by means of actuator device of the kind shown in FIG. 1. The shifting interface 34 shown in FIG. 2 has a shift lever 52 as a shifting component. This shift lever 52 is, for example, a conventional shift lever 52 of a motorcycle or other powered two- or three-wheeler having a footrest 54 which is mounted so as to be pivotable relative to an axis. For upshifting, i.e. a gear change to a higher gear, a shift lever 52 of this kind is pivoted briefly in one direction relative to a neutral position and, for downshifting, i.e. a gear change to a lower gear, is pivoted in the other direction. Such movements of the shift lever 52 can be achieved in a simple manner by means of an actuating mechanism 32 having a hydraulic cylinder 40 via the linkage 36. For this purpose, the linear motion of the piston 38 or linkage 36 must merely be adapted to the pivoting motion of the shifting component, that is to say in this case the shift lever 52. In the present case, this is accomplished by rotatable mounting of the hydraulic cylinder 40 by means of a first rotary bearing 56 relative to a position fixed in relation to the vehicle and rotatable mounting of the linkage 36 relative to the shift lever 52 by means of a second rotary bearing 58.

Figure 3:
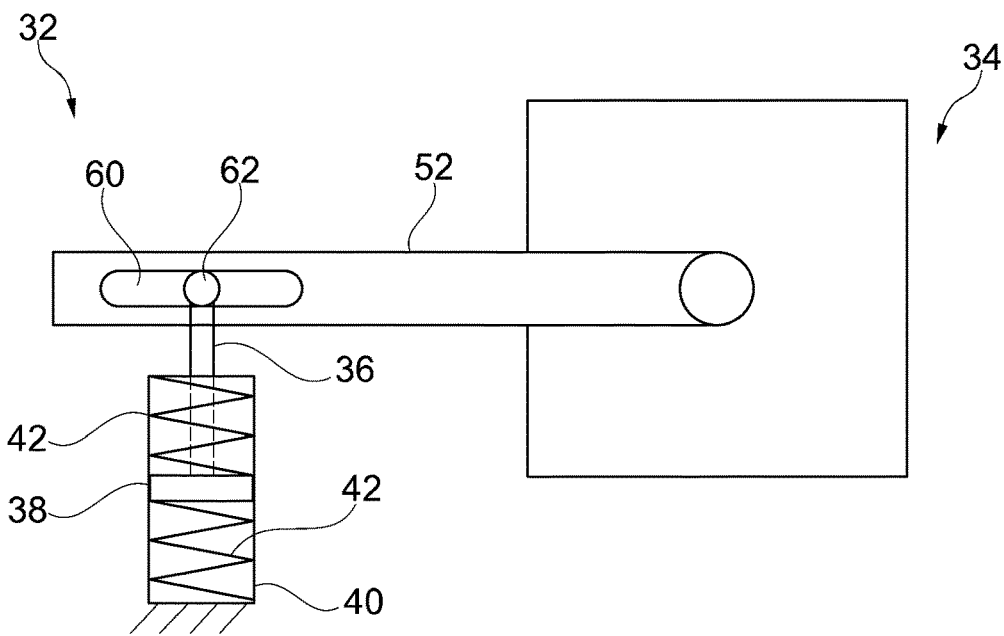
FIG. 3 shows a shifting interface and a second actuating mechanism.

FIG. 3 shows another example, in which the shifting interface 34 has a shift lever 52 as a shifting component. This shift lever 52 is likewise mounted so as to be pivotable relative to an axis. For upshifting, i.e. a gear change to a higher gear, this shift lever 52 too is pivoted briefly in one direction relative to a neutral position and, for downshifting, i.e. a gear change to a lower gear, is pivoted in the other direction. Here too, the linear motion of the piston 38 or linkage 36 of the cylinder 40 must merely be adapted to the pivoting motion of the shifting component, i.e., the shift lever 52. In the case shown in FIG. 3, this is accomplished by linear guidance of a pivot point 62 arranged on the linkage 36 in a linear guide 60 on/in the shift lever 52. In the example, this linear guide is formed by a slotted hole in the lever 52. In this embodiment, the hydraulic cylinder does not have to be pivotably mounted. It is mounted in a manner fixed in relation to the vehicle.

Figure 4:
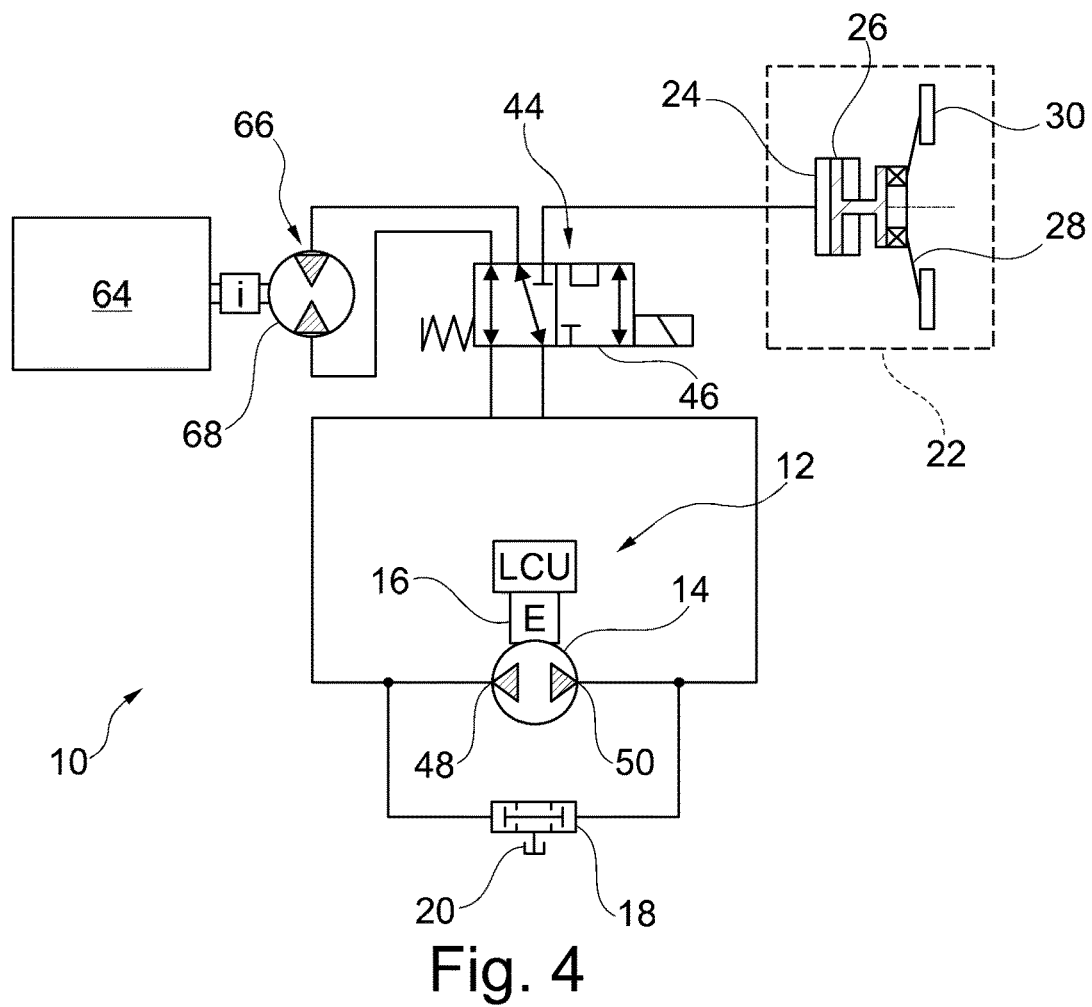
FIG. 4 shows an actuator arrangement for a motor vehicle transmission according to another example embodiment.

FIG. 4 shows another actuator arrangement 10, which corresponds substantially to the actuator arrangement 10 in FIG. 1, and therefore only the differences will be explored here.

A rotary actuating mechanism 66, e.g., a hydraulic motor 68, is arranged between the shifting interface 64, which has a rotary shifting component, and the switching logic device 44. The hydraulic motor 68 can be operated in a first direction and in a second direction opposite to the first direction. Thus, the hydraulic motor 68 has two connections, which are connected to the hydraulic switching logic device 44. A third mechanical connection, e.g. a shaft, is connected to the shifting interface 64. The hydraulic motor 68 converts the fluid pressure produced and applied by the pump 14 into a rotary motion and transmits this to the shifting interface 64, as a result of which the rotary shifting component of the shifting interface 64 undergoes a rotary displacement about its axis of rotation. One example of a rotary shifting component of this kind is a shifting shaft. Another example is a shifting drum.

In contrast to the passenger car application, the valve 46 on powered two- or three-wheelers may be in the rest position in the actuating position for supplying the shifting drum since it is also possible in certain operating states to shift without operating the clutch on powered two- or three-wheelers. Shifting can take place more quickly here since the valve 46 does not first have to be switched from "clutch operation" to "shifting".

For better detection and control of gear actuation, a position sensor (not shown here) can be used, said sensor serving to detect the motion of the shifting component (shift lever, shifting shaft, shifting pawl or shifting drum):

1. It can be a sensor which detects the entire actuator travel. Control is then based on the measured position.

2. It can also be a sensor which detects only the reaching of the central position of the hydraulic cylinder or motor 40, 68. In this case, control is based essentially on the counting of the revolutions of the electric motor.

Figure 5:
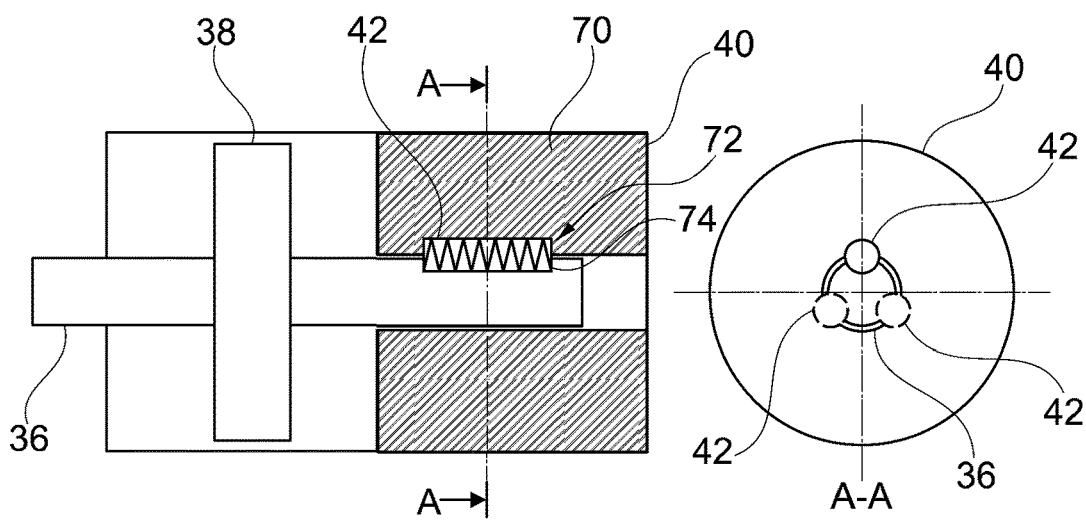
FIG. 5 shows details of the actuating mechanism shown in FIGS. 2 and 3.

Finally, FIG. 5 shows a practical implementation of the return device 42 for returning the actuating mechanism 32 with the hydraulic cylinder 40 to a neutral position. In contrast to the schematic illustrations in FIGS. 1 to 3, the return device 42 is here implemented in a bearing 70 for supporting the piston 38 via the shaft thereof or the linkage 36. The bearing bush of the bearing 70 and the shaft or linkage 36 have one or more slot-type recesses 72, 74. A spring unit 42 designed as a compression spring is arranged as a return device in the receiving space formed jointly by a slot-type recess 72 in the bearing and a slot-type recess 74 in the shaft/linkage, respectively. In the sectional illustration, shown on the right-hand side, comprising a section along section line A-A, three such receiving spaces/compression springs can be seen, which are arranged in a manner distributed circumferentially around the longitudinal axis of the shaft/linkage.

In particular, the spring unit 42 is inserted in such a way that the preload has to be overcome as soon as the neutral position is departed from. The transition is preferably hard. In this design, at least one, e.g., two to three, preloaded spring units 42 is used. As an alternative, two mutually matched spring units 42 could act in relation to both sides of the effective surfaces of the piston in order to implement the neutral position (not illustrated).

REFERENCE NUMERALS

10 actuator arrangement
12 pump device
14 pump
16 electric motor
18 two pressure valve
20 reservoir
22 clutch
24 cylinder
26 piston
28 spring element
30 pressure plate
32 actuating mechanism
34 shifting interface
36 linkage
38 piston
40 hydraulic cylinder
42 spring unit
44 switching logic device
46 valve
48 first outlet
50 second outlet
52 shift lever
54 footrest
56, 58 rotary bearing
60 linear guide
62 rotary bearing
64 interface
66 actuating mechanism
68 hydraulic motor
70 bearing
72, 74 recess

The invention claimed is:

1. An actuator arrangement for a motor vehicle transmission comprising:
    a clutch;
    a pump device comprising:
        a pump for fluidic actuation of the clutch; and
        an electric motor for driving the pump;
    a shifting interface connected to the pump device by a hydraulic actuating mechanism, the shifting interface configured for actuating the motor vehicle transmission and comprising at least one component selected from the group consisting of:
        a shift lever;
        a shifting pawl mechanism; or
        a shifting shaft;
    a switching logic device;
    a first fluid conduit directly connecting the switching logic device to the clutch; and
    a second fluid conduit directly connecting the switching logic device to the hydraulic actuating mechanism, wherein the switching logic device is arranged to distribute a fluid from the pump to actuate the shifting interface sequentially with respect to the clutch.

2. The actuator arrangement of claim 1, wherein the hydraulic actuating mechanism comprises a return device to return it to a neutral position.

3. The actuator arrangement of claim 2, wherein the return device comprises at least one spring element as a return element.

4. The actuator arrangement of claim 1, wherein the hydraulic actuating mechanism comprises a hydraulic cylinder.

5. The actuator arrangement of claim 1, wherein the switching logic device is a hydraulic switching logic device.

6. The actuator arrangement of claim 1, wherein the switching logic device is arranged between the shifting interface and the pump device.

7. The actuator arrangement of claim 1, wherein the pump is a reversing pump.

8. The actuator arrangement of claim 1, wherein the switching logic device comprises:
    a first operating position for actuating the clutch; and
    a second operating position for actuating the shifting interface via the hydraulic actuating mechanism.

9. The actuator arrangement of claim 8 wherein, in the first operating position, the switching logic device is arranged to fluidically connect the first fluid conduit to the pump.

10. The actuator arrangement of claim 8 wherein, in the second operating position, the switching logic device is arranged to fluidically connect the second fluid conduit to the pump.

11. The actuator arrangement of claim 10 further comprising a third fluid conduit directly connecting the switching logic device to the hydraulic actuating mechanism, wherein, in the second operating position, the switching logic device is arranged to fluidically connect the third fluid conduit to the pump.

12. The actuator arrangement of claim 11 wherein the pump is a reversing pump.

13. The actuator arrangement of claim 8 wherein the switching logic device further comprises a spring for urging the switching logic device into the second operating position.

* * * * *